United States Patent
Evans et al.

(10) Patent No.: US 6,363,179 B1
(45) Date of Patent: Mar. 26, 2002

(54) METHODOLOGY FOR DISPLAYING SEARCH RESULTS USING CHARACTER RECOGNITION

(75) Inventors: David A. Evans; Michael J. McInerny, both of Pittsburgh, PA (US)

(73) Assignee: Claritech Corporation, Pittsburgh, PA (US)

(*) Notice: Subject to any disclaimer, the term of this patent is extended or adjusted under 35 U.S.C. 154(b) by 0 days.

(21) Appl. No.: 09/228,221

(22) Filed: Jan. 11, 1999

(51) Int. Cl.[7] ................................................. G06K 9/03
(52) U.S. Cl. ........................................ 382/309; 707/526
(58) Field of Search ................................. 382/309, 310, 382/311, 312, 313; 707/526, 512, 527, 528, 529

(56) References Cited

U.S. PATENT DOCUMENTS

| | | |
|---|---|---|
| 4,677,406 A | 6/1987 | Lange et al |
| 4,773,039 A | 9/1988 | Zamora |
| 4,864,502 A | 9/1989 | Kucera et al. |
| 5,206,949 A | 4/1993 | Cochran et al. |
| 5,327,503 A * | 7/1994 | Hiyohara .................... 382/229 |
| 5,359,673 A | 10/1994 | De La Beaujardiere |
| 5,440,481 A | 8/1995 | Kostoff et al. |
| 5,541,836 A | 7/1996 | Church et al. |
| 5,606,690 A * | 2/1997 | Hunter et al. ................ 395/605 |
| 5,623,679 A * | 4/1997 | Rivette et al. ............... 707/229 |
| 5,742,816 A * | 4/1998 | Barr et al. ....................... 707/3 |
| 5,802,515 A * | 9/1998 | Adar et al. ...................... 707/5 |
| 5,960,448 A * | 9/1999 | Reichek et al. ............. 707/526 |

OTHER PUBLICATIONS

Text Search and Retrieval Training Manual (APS), U.S. Department of Commerce, Dec. 03, 1991.*
STN Express User Guide, Version 3.2, American Chemical Society, Mar. 1994.*
STN Express (undated), Version 4.1, American Chemical Society, 1988.*

* cited by examiner

Primary Examiner—Andrew W. Johns
Assistant Examiner—Seyed Azarian
(74) Attorney, Agent, or Firm—Jones, Day, Reavis & Pogue; Blaney Harper

(57) ABSTRACT

Document texts are produced by recognizing characters in document images by an Optical Character Recognition (OCR) process. When such a document text matches one or more search terms of a query, the corresponding document image is displayed. Regions of the document image, corresponding to words of the document text that match the search terms, are displayed in a visually distinctive manner. The display of the document image may be augmented by displaying a region corresponding to a reference text within the document text in another visually distinctive manner.

7 Claims, 6 Drawing Sheets

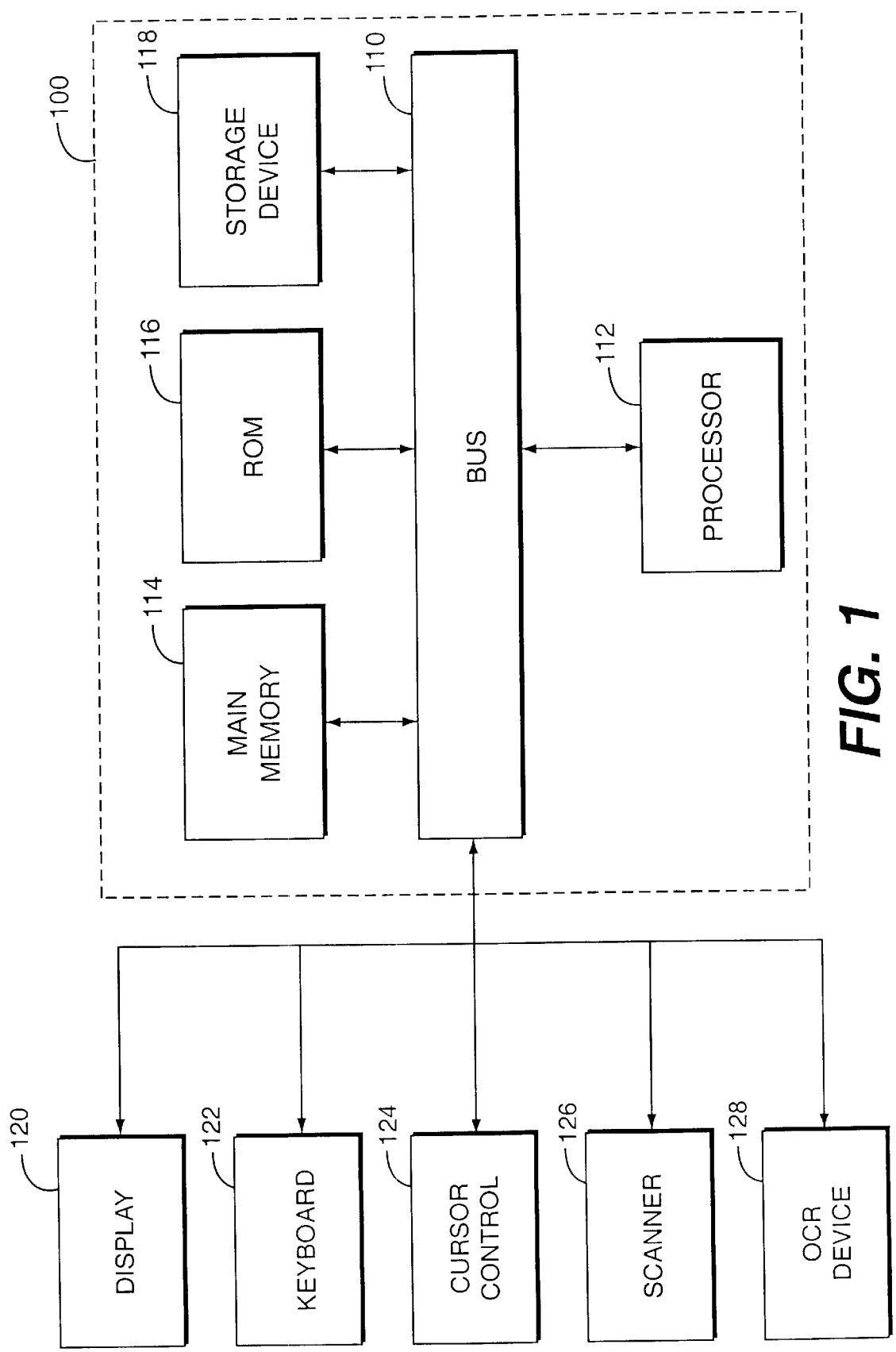

IMAGE DISPLAY — 300

WE THE PEOPLE OF THE UNITED STATES, IN ORDER TO FORM A MORE PERFECT UNION, ESTABLISH JUSTICE, ENSURE DOMESTIC TRANQUILITY, PROVIDE FOR THE COMMON DEFENSE -302, PROMOTE THE GENERAL WELFARE, AND SECURE THE BLESSINGS OF LIBERTY TO OURSELVES AND OUR POSTERITY, DO ORDAIN AND ESTABLISH THIS CONSTITUTION FOR THE UNITED STATES OF AMERICA.

FIG. 3(a)

IMAGE DISPLAY — 310

WE THE PEOPLE OF THE UNITED STATES, IN ORDER TO FORM A MORE PERFECT UNION, ESTABLISH JUSTICE, ENSURE DOMESTIC TRANQUILITY, PROVIDE FOR THE COMMON DEFENSE -312, PROMOTE THE GENERAL WELFARE, AND SECURE THE BLESSINGS OF LIBERTY TO OURSELVES AND OUR POSTERITY, DO ORDAIN AND ESTABLISH THIS CONSTITUTION FOR THE UNITED STATES OF AMERICA.

FIG. 3(b)

METHODOLOGY FOR DISPLAYING SEARCH RESULTS USING CHARACTER RECOGNITION

TECHNICAL FIELD

The present invention relates to computer systems and, more particularly, to an improved apparatus and methodology for displaying search results.

BACKGROUND ART

The volume of documents in computer databases is rapidly expanding. In spite of this expansion, paper documents are still in wide use. As a result, it is generally useful to be able to convert the paper documents into a form that a computer may use to store or otherwise process the documents. A typical technique for this conversion process is to create a "document image," which is typically a bitmap representation of the paper document. This bitmap representation is in digital form. In particular, a bitmap representation is a matrix of digital values wherein each value represents black-and-white, grey scale, or color pixels arranged to form an image of the document. A computer converts the digital values into pixels that are displayed for a user on a display unit, such as a computer monitor. The combined effect of the pixels is to create a document image which is read by the user from the computer monitor.

Although a document image is an appropriate form for representing most, if not all, of the information on a paper document, e.g., words and pictures, this form is not generally appropriate for a computer to perform textual operations. An example of a textual operation is searching for documents that match certain terms or keywords of a query input by a user. A representation for a document which is more conducive for computer-implemented textual operations is a text code. In a text code, each letter of the document is encoded as an entity in a standard encoding format, e.g. ASCII. Since each letter is separately encoded, a search engine, for example, can efficiently examine the textual content of a document and determine whether the document matches a query.

The problem with a text code is that it does not represent non-alphabetic and non-numeric images, such as pictures, in the document. Generally, when a document is converted into a form for use with a computer, it is desirable that both text operations and image display can be performed on the document. Accordingly, some computer systems maintain both a document image and document text for each document stored in the system. The document text is used for textual operations, such as searching a database of document texts for search terms, but the corresponding document image of a matching document is displayed to the user, so that graphical information contained in the matching document is presented to the user as well as the textual information.

One disadvantage of conventional computer systems, however, is that it is difficult for the user to determine from the document image which parts of the document matched the search terms and whether the matching document is relevant to the user.

DISCLOSURE OF THE INVENTION

There exists a need for facilitating the identification of which parts of a document match search terms when displaying an image of a document. There is also a need for making it easier for a user to determine whether a matching document is relevant.

This and other needs are met by the present invention, in which characters in document images from original paper documents are recognized, e.g. through OCR, to produce respective document texts. Regions in the document images that correspond to words in the respective document texts are determined. A matching document, which includes a word matching a search term received as input, from among the document texts is retrieved, e.g. by a search engine. A matching document image corresponding to the matching document text is displayed in a first manner. A featured region in the matching document image that includes a matching region in the matching document image corresponding to the matching word is determined and displayed in a second manner that is visually distinct from the first manner, for example, highlighted in one color.

By displaying in a visually distinctive manner a region of the document image that corresponds to a matching word in the document text, the user can more easily determine which parts of the document matched a search term.

In one embodiment, the featured region is a region of the document image corresponding to the matching word in the document text. In another embodiment, the featured region is a region of the document image corresponding to a noun phrase of consecutive words including the matching words of the document text.

In still another embodiment of the invention, a reference text, which is different from any of the search terms, in the document text is determined. A second featured region in the matching document image that includes regions in the matching document image corresponding to the reference text is determined and displayed in a third manner that is visually distinct from the first manner and the second manner, for example, highlighted in another color. By highlighting reference texts in the document image in a second visually distinctive manner, the user can quickly determine by looking at the search terms and the reference texts how relevant the matching document is.

Additional objects, advantages, and novel features of the present invention will be set forth in part in the detailed description which follows, and in part will be come apparent upon examination or may be learned by practice of the invention. The objects and advantages of the invention may be realized and obtained by means of the instrumentalities and combinations particularly pointed out in the appended claims.

BRIEF DESCRIPTION OF DRAWINGS

The present invention is illustrated by way of example, and not by limitation, in the figures of the accompanying drawings, wherein elements having the same reference numeral designations represent like elements throughout and wherein:

FIG. 1 is a high-level block diagram of a computer system with which the present invention can be implemented.

FIGS. 3(a) and 3(b) are an exemplary screen displays according to embodiments of the present invention.

DETAILED DESCRIPTION OF THE INVENTION

Figure 2A:
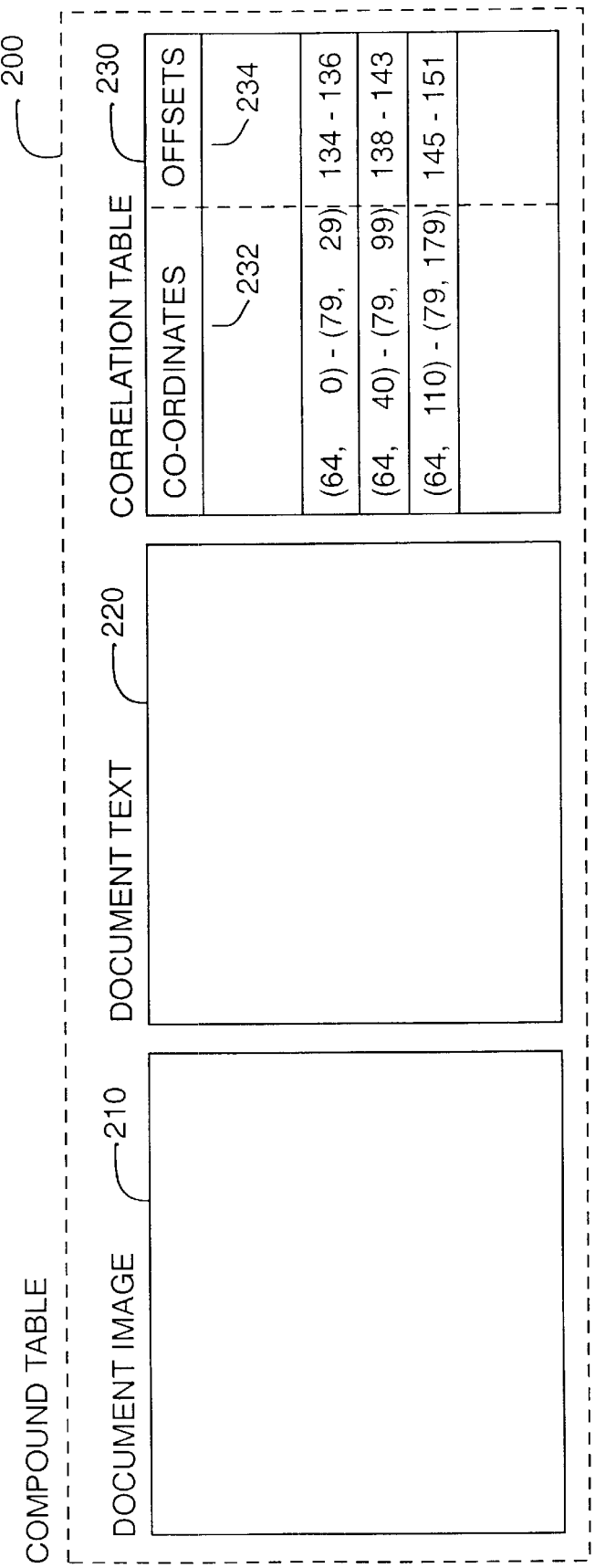
FIG. 2(a) is a block diagram of the architecture of a compound document.

A method and apparatus for displaying search results are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Hardware Overview

Referring to FIG. 1, depicted is a block diagram of a computer system 100 upon which an embodiment of the present invention can be implemented. Computer system 100 includes a bus 110 or other communication mechanism for communicating information, and a processor 112 coupled with bus 110 for processing information. Computer system 100 further comprises a random access memory (RAM) or other storage device 114 (referred to as main memory), coupled to bus 110 for storing information and instructions to be executed by processor 112. Main memory 114 also may be used for storing temporary variables or other intermediate information during execution of instructions by processor 112. Computer system 100 also comprises a read only memory (ROM) and/or other storage device 116 coupled to bus 110 for storing static information and instructions for processor 112. A data storage device 118, such as a magnetic disk or optical disk and its corresponding disk drive, can be coupled to bus 110 for storing information and instructions.

Input and output devices can also be coupled to computer system 100 via bus 110. For example, computer system 100 uses a display unit 120, such as a cathode ray tube (CRT), for displaying information to a computer user. Computer system 100 further uses a keyboard 122 and a cursor control 124, such as a mouse. In addition, computer system 100 may employ a scanner 126 for converting paper documents into a computer readable format. Furthermore, computer system 100 can use an Optical Character Recognition (OCR) device 128 to recognize characters in a document image produced by scanner 126 or stored in main memory 114 or storage device 118. Alternatively, the functionality of OCR device 128 can be implemented in software, by executing instructions stored in main memory 114 with processor 112. As an option, scanner 126 and OCR device 128 can be combined into a single device configured to both scan a paper document and recognize characters thereon.

The present invention is related to the use of computer system 100 for displaying results from a search engine. According to one embodiment, displaying search results is performed by computer system 100 in response to processor 112 executing sequences of instructions contained in memory 114. Such instructions may be read into memory 114 from another computer-readable medium, such as data storage device 118. Execution of the sequences of instructions contained in memory 114 causes processor 112 to perform process steps that will be described hereafter. In alternative embodiments, hard-wired circuitry may be used in place of or in combination with software instructions to implement the present invention. Thus, the present invention is not limited to any specific combination of hardware circuitry and software.

The software aspects encompass computer readable media or carrier waves bearing sequences of computer executable instructions for performing the steps of the invention. A computer readable medium, as used herein, may be any medium that can bear instructions or code for performing a sequence of steps in a machine readable form, such as a floppy disk, flexible disk, hard disk, magnetic tape, any other magnetic medium, a CD-ROM, any other optical medium, paper tape, punch cards, any other physical medium with patterns of holes, a RAM, ROM, PROM, EPROM, FLASH-EPROM, and any other memory chip or cartridge. A carrier wave signal is any type of signal that may carry digital information representative of the instructions or code for performing a sequence of steps. Such a carrier wave may be received via a network, over a modem, or as a radio-frequency or infrared signal, or any other type of signal which a computer may receive and decode.

Compound Document Architecture

A compound document contains multiple representations of a document and treats the multiple representations as a logical whole. A compound document 200, shown in FIG. 2(a), is stored in a memory, such as main memory 114 or storage device 118 of computer 100.

Compound document 200 comprises a document image 210, which is a bitmap representation of a document, e.g. a TIFF file produced from scanner 126. For example, a copy of the U.S. Constitution on paper may be scanned by scanner 126 to produce a document image of the U.S. Constitution in document image 210.

A bitmap representation is an array of pixels, which can be monochrome (e.g. black and white) or polychrome (e.g., red, blue, green, etc.). Thus, the location of a rectangular region in the document image 210 can be identified, for example, by the co-ordinates of the upper left corner and the lower right corner of the rectangle. In the example of scanning the U.S. Constitution, the first letter of the word "defence" in the preamble, may be located in a rectangle with an upper left co-ordinate of (64, 110) and a lower right co-ordinate of (79, 109). Accordingly, the last of letter of the same word would be located with the co-ordinates (64, 170) and (79, 179).

Figure 2B:
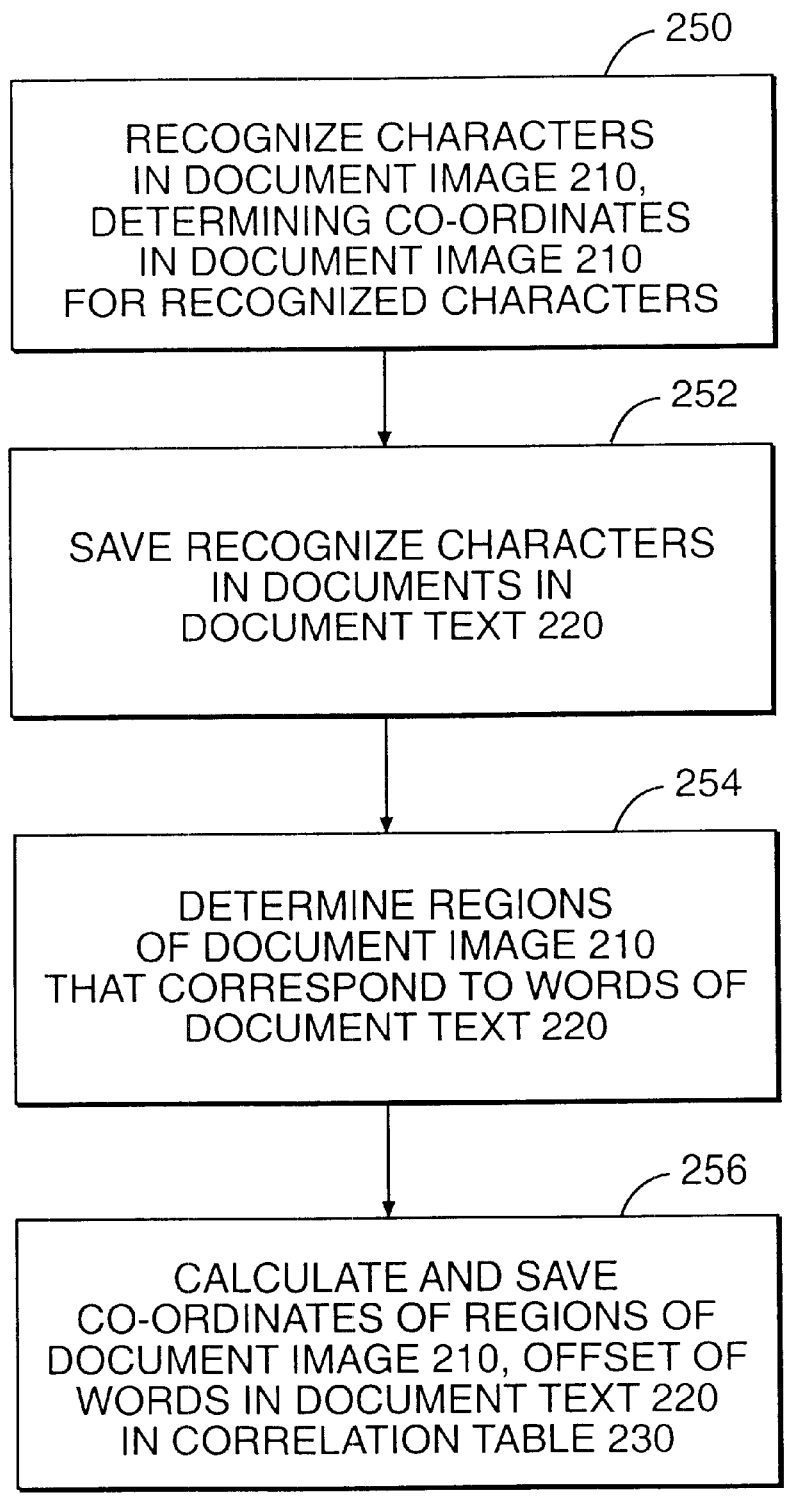
FIG. 2(b) is a flow chart illustrating the operation of creating a compound document.

Compound document 200 also comprises a document text 220 and a correlation table 230, which may be produced by the method illustrated in the flow chart of FIG. 2(b). A document text 220 is a sequence of 8-bit or 16-bit bytes that encode characters in an encoding such as ASCII, EBCDIC, or Unicode. Thus, characters in the document text 220 can be located by offsets into the document text 220. In the example, the first character of the word "defence" in the preamble of the U.S. Constitution is at offset 145, and the last character of the word is at offset 151.

Referring to FIG. 2(b), characters in document image 210 are recognized in step 250, by OCR device 128 or an equivalent thereof, and saved in step 252 in document text 220. OCR device 128 is also configured to output in step 250 the co-ordinates in the document image of the characters that are recognized. Thus, recognized characters at a known offset in the document text 220 can be correlated with regions of the document image 210. In the example, the character at offset 145 is correlated with the region defined by the co-ordinates (64, 110) and (79, 119).

In step 254, words in the document text 220 are identified, for example, by taking the characters between spaces as words. In step 256, the regions in the document image 210 that correspond to the characters of the words are coalesced into one region corresponding to an entire word of the document text 220. In one embodiment, the region of document is defined as a rectangle with the most upper left co-ordinate and the most lower right co-ordinate of the co-ordinates of the regions corresponding to the individual characters. For example, the region corresponding to the word "defence" in the preamble is defined by a rectangle with the co-ordinates (64, 110) and (79, 179). Alternatively, a list of the co-ordinates for all the underlying character may be saved, especially for documents with mixed size characters.

Information about each word of document text 220 is saved in step 254 in correlation table 230, so that regions of document image 210 can be correlated with words in document text 220. Specifically, correlation table 230 stores a pair of co-ordinates 232 defining the region in document image 210, and a pair of offsets 234 defining the location of the word in document text 220. In the example, the word "defence" would have a pair of co-ordinates 232 of (64, 110) and (79, 179) and a pair of offsets 234 of 145 and 151.

With correlation table 230, offsets 234 in document text 220 correspond to regions of document image 210 identified by co-ordinates 232, and vice versa. For example, given a co-ordinate of (70, 127), the co-ordinate 232 file of the correlation table 230 can be scanned to determine that the given co-ordinate is found in a word at offsets 145–151. The word at that offset in document text 220 can be fetched from document text 220, in the example, the word "defence."

In the other direction, the correlation table 230 can be scanned for a given offset, e.g. 146, and the resulting rectangle with co-ordinates of (64, 110) and (79, 179) can be identified. Thus, the compound document architecture described herein provides a way of correlating the location of words in the document text 220 with corresponding regions of the document image 210.

Displaying Search Results in a Document Image

The scanned image of a document that matches a query, i.e. document image 210, is retrieved from a database and displayed to a user, so that non-textual information as well as textual information contained in the document may be output to the user. In the example of retrieving the U.S. Constitution, the scanned image of the preamble may be displayed in image display 300 as shown in FIG. 3(*a*).

Figure 4A:
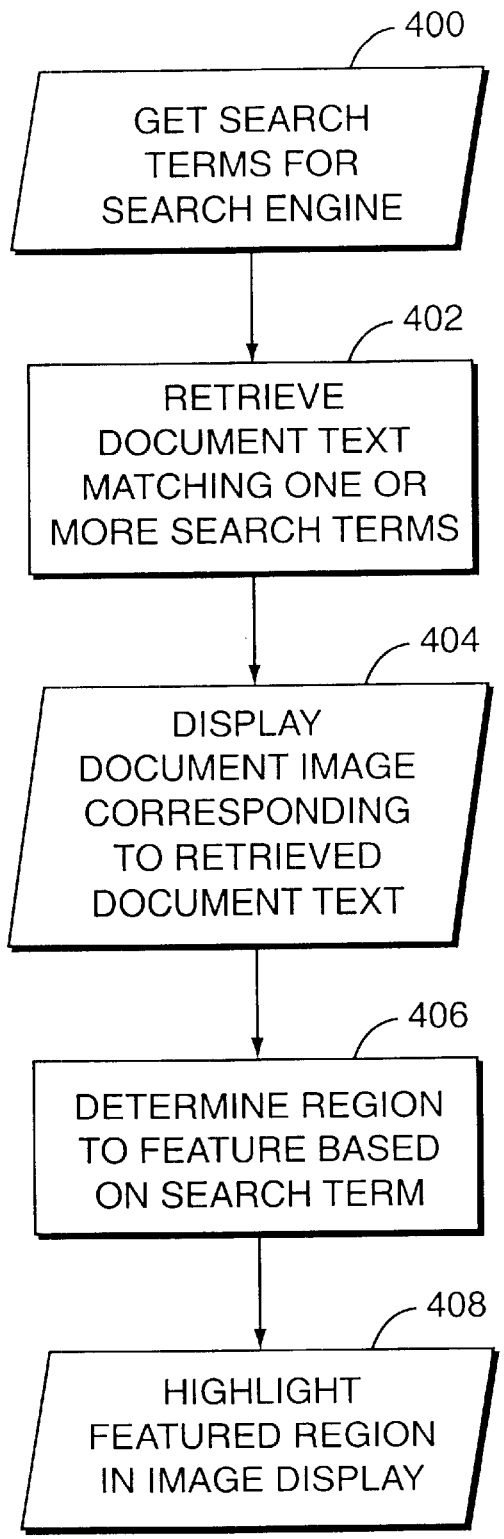
FIGS. 4(a) and 4(b) are flow charts illustrating the operation of displaying search results according to embodiments of the present invention.
Figure 4B:
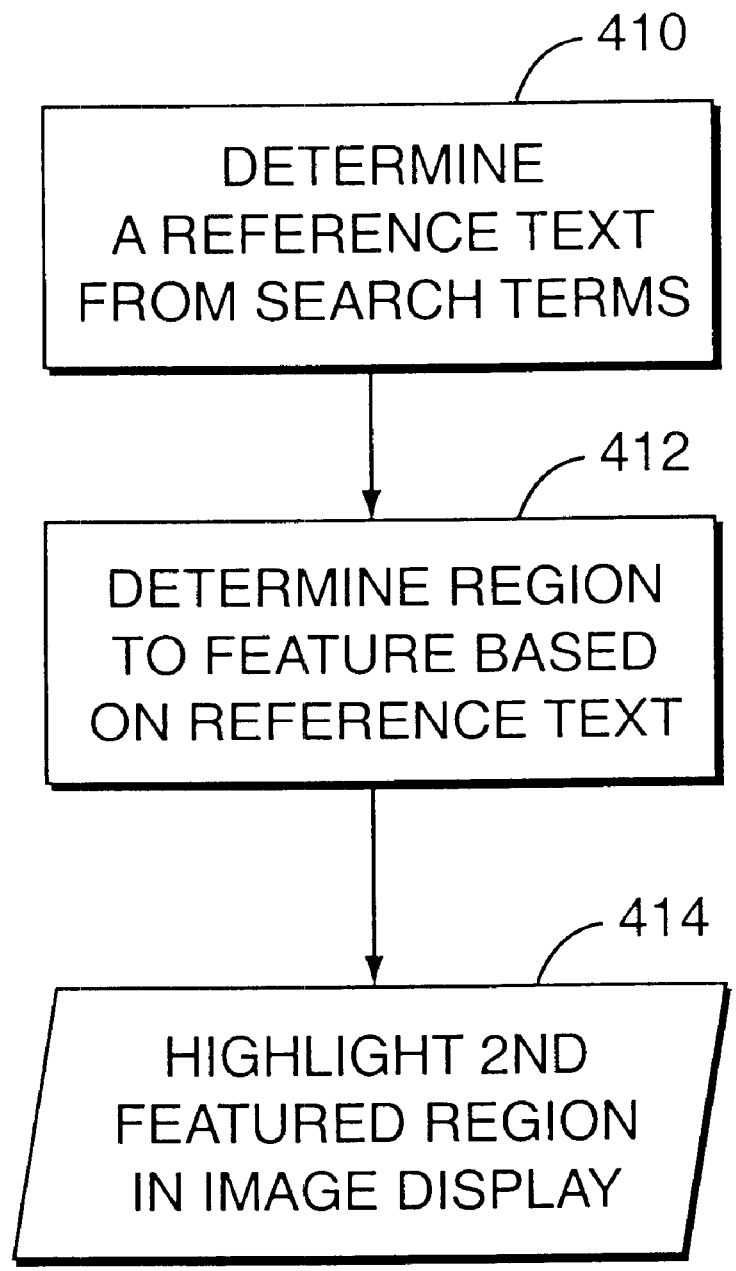

The operation of displaying search results according to an embodiment of the invention is illustrated in the flow chart of FIG. 4(*a*). In step 400, one or more search terms of a search query are received as input, e.g. through an input device such as keyboard 122 or cursor control 124, and submitted to a search engine. The search engine can be a hardware device or an application program executing on a general purpose computer. As well-known in the art, the search engine can receive search terms in boolean expressions (with AND, OR, and NOT) or merely a list of search terms for use in a vector space retrieval model.

In step 402, the search engine retrieves a document text 220 by matching a search term or combination thereof to regions of text contained in the documents of a database. This type of conventional search engine is well known in the art. The database of documents is produced from respective document images 210 by recognizing characters as explained hereinbefore. The document image 210 corresponding to the retrieved document text 220 is displayed in step 404.

A region that features a matching word in the displayed document image 210 is determined based on the search terms and the document text 220 (step 406) and displayed in a visually distinctive manner (step 408). One visually distinctive manner is highlighting the featured region, e.g. by changing the background color from white to yellow. Other visually distinctive manners include blinking or flashing the foreground color of featured region in the document image 210 or outlining the featured region in another color.

According to one embodiment as illustrated in FIG. 3(*a*), the featured region is a region of the document image 210 that corresponds to a word in the document text 220 that matches one of the search terms. In specific, the document text 220 is scanned for a search term, and if a search term is found, the offset of the matching word is used to determine the featured region by looking up the offset in correlation table 230. In this embodiment, if the word "defence" is a search term, then the document text 220 includes the word at offset 145. According to correlation table 230, the corresponding region is defined by the co-ordinates (64, 110) to (79, 179). Consequently, region 302 in image display 300 is displayed in a visually distinctive manner, e.g. highlighted.

According to another embodiment illustrated in FIG. 3(*b*), the featured region is the region of consecutive words of a noun phrase that contains the matching words. A noun phrase, as well-known in linguistics, is a noun and modifiers thereof. For example, in the preamble to the U.S. Constitution, the following are noun phrases: "the People," "the United States," "a more perfect Union," and "the common Defence." Noun phrases are one of the most useful contexts of a search term for allowing people to determine the relevance of a matching search term. In this example, the noun phrase "the common Defence" includes a search term "defence." Accordingly, the featured region is an amalgamation of the regions of the constituent words, or (64, 0) to (79, 179). Consequently, region 312 of image display 310 is displayed in a visually distinctive manner, e.g. by highlighting. Identifying and highlighting noun phrases for the user allow very relevant contexts of search terms within document text 210 to be featured to the user.

Using a Reference Database to Augment the Display

In another embodiment of the invention, the operation of which is illustrated in the flowchart of FIG. 4(*b*), the visual display of a matching document image is augmented by displaying a reference text in another visually distinctive manner. The reference text is generated in step 410 based on a reference database and the search terms, but is different from the matching words. The reference database may be chosen by the user or automatically determined from the search terms for supplying additional terms that help in identifying the relevance of the results of a search.

For example, a reference database can be a list of synonyms from which words that have a similar meaning to a search term are selected as the reference text. In this case, words synonymous or related with "defence" may include reference terms such as "offence," "army," and "navy."

As another example, a reference database may include a list of jargon specific to a subject area identified by a user, e.g. U.S. history. In yet another example, each document text can be previously classified as belonging to a subject area, e.g. the U.S. Constitution as a document of U.S. history. In this case, the reference database may supply reference texts such as "independence," "constitution," and "president."

In still another example, the reference database may include a working set of documents matched by the search query. In this case, reference texts can be automatically generated from the working set, e.g. by determining words having a median frequency in the working set or by thesaurus discovery.

In step 412; regions in the document image 210 corresponding to the reference text are determined, as explained hereinabove in connection with step 406. The regions corresponding to the reference text are displayed in still another visually distinctive manner (step 414). For example, if words matching search terms are highlighted in yellow, then reference texts may be highlighted in green.

While the invention has been particularly described and illustrated with reference to a preferred embodiment, it will be understood by one of skill in the art that changes in the above description or illustrations may be made with respect to formal detail without departing from the spirit and scope of the invention.

What is claimed is:

1. A method of outputting search results, comprising the computer implemented steps of:

recognizing characters in a plurality of document images to produce respective document texts;

determining regions of the document images that correspond to words of the respective document texts;

receiving an input indicating one or more search terms;

retrieving a matching document text from among the document texts based on the one or more search terms, wherein the matching document text includes at least one matching word that matches one of the search terms;

displaying, in a first manner, a matching document image corresponding to the matching document text;

automatically determining a featured region based on the one or more search terms in the matching document image that includes a matching region in the matching document image corresponding to the matching word; and automatically displaying the featured region in the matching document images in a second manner visually distinct from the first manner, wherein said second manner is not chosen by a user between said automatically determining step and said automatically displaying step.

2. The method of claim 1, wherein the step of determining a featured region includes the step of determining the featured region to be the matching region.

3. An apparatus for outputting search results, comprising:

an OCR device for recognizing characters in a plurality of document images to produce respective document texts;

means for determining regions of the document images that correspond to words of the respective document texts;

an input device for receiving an input indicating one or more search terms;

a search engine for retrieving a matching document text from among the document texts based on the one or more search terms, wherein the matching document text includes at least one matching word that matches one of the search terms;

a display unit for displaying in a first manner, a matching document image corresponding to the matching document text; and means for automatically determining a featured region based on the one or more search terms in the matching document image that includes a matching region in the matching document image corresponding to the matching word;

wherein said display unit is controllable to display the featured region in the matching document image in a second manner visually distinct from the first manner, wherein said second manner is not chosen by a user between automatically determining said featured region and automatically displaying said featured region.

4. The apparatus of claim 3, wherein the means for determining a featured region includes means for determining the featured region to be the matching region.

5. A computer readable medium bearing sequences of instructions for outputting search results and sequences of instruction comprising sequences of instructions for performing the steps of:

recognizing characters in a plurality of document images to produce respective documents texts;

determining regions of the document images that correspond to words of the respective document texts;

receiving an input indicating one or more search terms;

retrieving a matching document text from among the document texts based on the one or more search terms, wherein the matching document text includes at least one matching word that matches one of the search terms;

displaying, in a first manner, a matching document image corresponding to the matching document text;

automatically determining a featured region based on the one or more search terms in the matching document image that includes a matching region in the matching document image corresponding to the matching word; and automatically displaying the featured region in the matching document image in a second manner visually distinct from the first manner, wherein said second manner is not chosen by a user between automatically determining the featured region and automatically displaying the featured region.

6. The computer readable medium of claim 5, wherein the step of displaying the featured region includes the step of highlighting the featured region.

7. The computer readable medium of claim 5, wherein the step of determining a featured region includes the step of determining the featured region to be the matching region.

* * * * *

UNITED STATES PATENT AND TRADEMARK OFFICE
CERTIFICATE OF CORRECTION

PATENT NO. : 6,363,179 B1  Page 1 of 1
APPLICATION NO. : 09/228221
DATED : March 26, 2002
INVENTOR(S) : David A. Evans and Michael J. McInerny It is certified that error appears in the above-identified patent and that said Letters Patent is hereby corrected as shown below:

Title page

Below: "(22) Filed: January 11, 1999"

Insert:

-- Related U.S. Application Data

(62) Division of application No. 08/900,640, filed on July 25, 1997, now Pat. No. 5,987,448. --

Signed and Sealed this

Twelfth Day of May, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,363,179 B1 | Page 1 of 1 |
| APPLICATION NO. | : 09/228221 | |
| DATED | : March 26, 2002 | |
| INVENTOR(S) | : David A. Evans | |

It is certified that error appears in the above-identified patent and that said Letters Patent is hereby corrected as shown below:

Title Page, item [62] prior to the section title "Field of the Invention" please insert the following paragraph:

--This application is a divisional application of patent application serial number 08/900,640 filed July 25, 1997, now issued--

Signed and Sealed this

Sixth Day of April, 2010

David J. Kappos
*Director of the United States Patent and Trademark Office*